US012641538B2

(12) United States Patent
Chen et al.

(10) Patent No.: US 12,641,538 B2
(45) Date of Patent: May 26, 2026

(54) METHOD AND DEVICE FOR PHYSICAL DOWNLINK CONTROL CHANNEL (PDCCH) MONITORING IN WIRELESS COMMUNICATION

(71) Applicant: Apogee Networks, LLC, Dallas, TX (US)

(72) Inventors: Yu Chen, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 0 days.

(21) Appl. No.: 18/434,767

(22) Filed: Feb. 6, 2024

(65) Prior Publication Data

US 2024/0251348 A1    Jul. 25, 2024

Related U.S. Application Data

(63) Continuation of application No. PCT/CN2022/121558, filed on Sep. 27, 2022.

(30) Foreign Application Priority Data

Oct. 11, 2021    (CN) .......................... 202111181912.X

(51) Int. Cl.
H04W 52/02       (2009.01)
H04W 72/21       (2023.01)
H04W 84/06       (2009.01)

(52) U.S. Cl.
CPC ... H04W 52/0216 (2013.01); H04W 52/0235 (2013.01); H04W 72/21 (2023.01); H04W 84/06 (2013.01)

(58) Field of Classification Search
CPC ......... H04W 52/0216; H04W 52/0235; H04W 72/21; H04W 84/06
See application file for complete search history.

(56) References Cited

U.S. PATENT DOCUMENTS

| | | | |
|---|---|---|---|
| 11,910,468 B2 | 2/2024 | Hong | |
| 12,058,766 B2 | 8/2024 | Zhang | |
| 2019/0239160 A1 | 8/2019 | Lee et al. | |
| 2020/0146062 A1* | 5/2020 | Xu | ........................ H04W 72/23 |

(Continued)

OTHER PUBLICATIONS

ISR received in application No. PCT/CN2022/121558 dated Dec. 16, 2022.

(Continued)

*Primary Examiner* — Jae Y Lee
*Assistant Examiner* — Nick Anon Sundara
(74) *Attorney, Agent, or Firm* — Volpe Koenig

(57) ABSTRACT

The present application discloses a method and a device for wireless communications, including: receiving a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and transmitting the first scheduling request on a first PUCCH resource; and monitoring a PDCCH in the Active Time. The present application can conserve power by receiving the first message and determining the Active Time.

8 Claims, 6 Drawing Sheets

(56)          References Cited

U.S. PATENT DOCUMENTS

2021/0007173  A1       1/2021  Su
2021/0185614  A1*      6/2021  Zhou ................. H04W 52/0225
2022/0007320  A1*      1/2022  Sengupta .............. H04W 76/30
2022/0361144  A1*     11/2022  He ........................ H04W 72/23

OTHER PUBLICATIONS

Ericsson "Text proposal on DRX, HARQ and UL scheduling"3GPP TSG-RAN WG2 #108 R2-1916415 Nov. 29, 2019.
Interdigital, MediaTek, Samsung "UL HARQ RTT timer in NTN" 3GPP RAN WG2 Meeting #114e R2-2106047 May 11, 2021.
Third Generation Partnership Project, "Technical Specification Group Radio Access Network; NR; Physical channels and modulation (Release 16)," 3GPP TS 38.211 V16.7.0 (Sep. 2021).
Third Generation Partnership Project, "Technical Specification Group Radio Access Network; NR; Physical layer procedures for control (Release 16)," 3GPP TS 38.213 V16.7.0 (Sep. 2021).
Third Generation Partnership Project, "Technical Specification Group Radio Access Network; NR; Physical layer procedures for data (Release 16)," 3GPP TS 38.214 V16.7.0 (Sep. 2021).
Third Generation Partnership Project, "Technical Specification Group Radio Access Network; NR; User Equipment (UE) procedures in Idle mode and RRC Inactive state (Release 16)," 3GPP TS 38.304 V16.6.0 (Sep. 2021).
Third Generation Partnership Project, "Technical Specification Group Radio Access Network; NR; Medium Access Control (MAC) protocol specification (Release 16)," 3GPP TS 38.321 V16.6.0 (Sep. 2021).
Third Generation Partnership Project, "Technical Specification Group Radio Access Network; NR; Radio Resource Control (RRC) protocol specification (Release 16)," 3GPP TS 38.331 V16.6.0 (Sep. 2021).

* cited by examiner

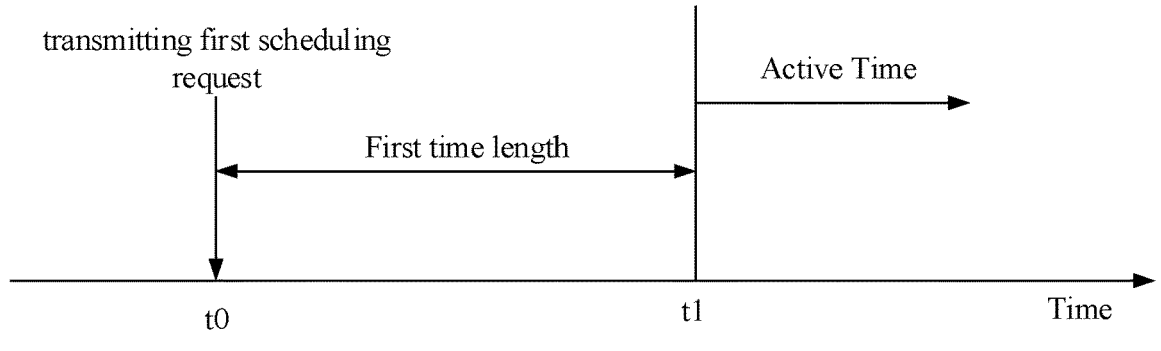
FIG. 7
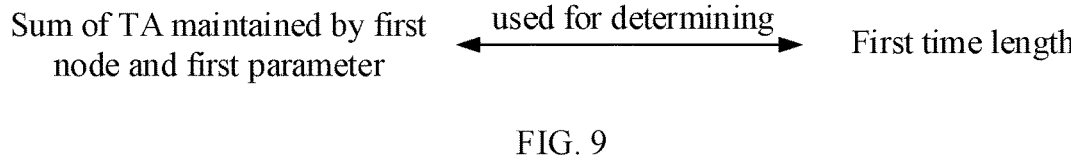
FIG. 8
Sum of TA maintained by first node and first parameter    used for determining    First time length
FIG. 9
Second parameter and third parameter    used together for determining    Uplink transmission time of first node
FIG. 10
At least one of second parameter or third parameter    used for determining    Transmission timing of first PUSCH
FIG. 11

METHOD AND DEVICE FOR PHYSICAL DOWNLINK CONTROL CHANNEL (PDCCH) MONITORING IN WIRELESS COMMUNICATION

CROSS REFERENCE TO RELATED APPLICATIONS

This application is the continuation of the international patent application No. PCT/CN2022/121558, filed on Sep. 27, 2022, and claims the priority benefit of Chinese Patent Application No. 202111181912.X, filed on Oct. 11, 2021, the full disclosure of which is incorporated herein by reference.

BACKGROUND

Technical Field

The present application relates to transmission methods and devices in wireless communication systems, and in particular to a method and device for power conservation in non-terrestrial networks in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

The 3GPP standardization organization has worked on 5G standardization to formulate a series of specifications such as 38.304, 38.211, and 38.213, of which the details can refer to:

https://www.3gpp.org/ftp/Specs/archive/38_series/ 38.304/38304-g40.zip https://www.3gpp.org/ftp/Specs/archive/38_series/ 38.211/38211-g50.zip https://www.3gpp.org/ftp/Specs/archive/38_series/ 38.213/38213-g50.zip https://www.3gpp.org/ftp/Specs/archive/38_series/ 38.321/38321-g50.zip

SUMMARY

In many communication scenarios, particularly when relating to NTN, due to a long communication distance, the demand for saving power becomes very common. Reducing the monitoring of PDCCH helps reduce the power consumption. The monitoring of PDCCH involves blind detection, namely, a UE performs reception and attempts decoding of information on potential time-frequency resources because the UE cannot know in advance whether there is an exact signaling transmission for it on these time-frequency resources, so that the attempts of decoding are also called blind decoding or blind detection, from which there may be useful information deciphered, which has passed the Cyclic Redundancy Check (CRC), or no useful information can be obtained due to the failure of CRC. The range of time-frequency resources for monitoring PDCCH is roughly configured by the system, for instance, via a search space or a control resource set (CORESET), and each time of monitoring can cover several dozens of blind detections, among which most attempts of blind decoding are not likely to decipher useful information, but contribute to great power consumption. For TN, to ensure more flexible scheduling, it may be necessary to monitor a PDCCH immediately after transmitting a scheduling request, because the base station will receive the scheduling request in a very short time and can schedule a UE at any time. For NTN, where the propaganda relay is huge, after a UE transmits a scheduling request, the signal shall go through a long time of transmission to get to the base station, so it is impossible for the UE to receive a scheduling signaling at once, which means that monitoring a PDCCH in a certain period since the transmission of the scheduling request can be meaningless. The monitoring of PDCCH is mainly under the control of an Active Time, namely, a UE is required to monitor a PDCCH within the Active Time. Therefore, how to reduce the monitoring of PDCCH after transmitting a scheduling request in NTN is an issue to be addressed by the present application, but how to control the action of PDCCH monitoring properly while ensuring the flexibility of scheduling is also something the present application shall take into account.

To address the above problem, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

receiving a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and transmitting the first scheduling request on a first PUCCH resource; and monitoring a PDCCH in the Active Time.

In one embodiment, a problem to be solved in the present application includes: In NTN, how to control the monitoring of a PDCCH to save energy and ensure the scheduling flexibility after a scheduling request is transmitted.

In one embodiment, an advantage of the above method includes: reducing monitoring of a PDCCH after transmitting a scheduling request, without missing any information possibly transmitted by the PDCCH, thus reducing the power consumption and guaranteeing the communication performance.

Specifically, according to one aspect of the present application, incrementing a first counter by 1 along with a transmission of the first scheduling request;

herein, only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted.

Specifically, according to one aspect of the present application, incrementing a first counter by 1 along with a transmission of the first scheduling request;

herein, the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter.

Specifically, according to one aspect of the present application, receiving a first system information block (SIB); the first system information block (SIB) indicating a first parameter, where the first parameter is measured in slot(s);

herein, a sum of a Timing Advance (TA) maintained by the first node and the first parameter is used for determining the first time length; the first message indicates that the Active Time comprises a period of time during which the first scheduling request is in a pending state deferred by the first time length after being transmitted.

Specifically, according to one aspect of the present application, receiving a first system information block (SIB) and a first Media Access Control Control Element (MAC CE), the first MAC CE indicating a second parameter; the second parameter is measured in slot(s); the first SIB indicates a third parameter, the third parameter being measured in slot(s);

the first transmitter, incrementing a first counter by 1 along with a transmission of the first scheduling request; and as a response to that the first counter is equal to or greater than a first threshold, initiating a first random access procedure; the action of initiating a first random access procedure comprises transmitting a second message on time-frequency resources indicated by a random access response (RAR) for the first random access procedure; the second message occupying a first physical uplink shared channel (PUSCH);

herein, the second parameter and the third parameter are used together for determining an uplink transmission time of the first node; at least one of the second parameter or the third parameter is used for determining a transmission timing of the first PUSCH.

Specifically, according to one aspect of the present application, starting a first timer along with a transmission of the first scheduling request;

herein, the first scheduling request is transmitted only when the first timer is not running, and an expiration value of the first timer is equal to the first time length; the first message indicates that the Active Time comprises a period of time during which the first scheduling request is in a pending state deferred by the first time length after being transmitted.

Specifically, according to one aspect of the present application, generating a second MAC CE; and as a response to at least generating the second MAC CE, triggering the first scheduling request; transmitting a first MAC PDU group; and along with the transmission of the first MAC PDU group, canceling the first scheduling request; the first MAC PDU group comprising at least one MAC PDU;

herein, the action of monitoring a PDCCH in the Active Time comprises receiving a first signaling; the first MAC PDU group occupies time-frequency resources indicated by the first signaling.

Specifically, according to one aspect of the present application, receiving a first scheduling request configuration, where a scheduling request configuration corresponding to the first scheduling request is the first scheduling request configuration;

along with a transmission of any scheduling request corresponding to the first scheduling request configuration, incrementing a first counter by 1;

herein, only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted.

Specifically, according to one aspect of the present application, receiving a first scheduling request configuration, where a scheduling request configuration corresponding to the first scheduling request is the first scheduling request configuration;

along with a transmission of any scheduling request corresponding to the first scheduling request configuration, incrementing a first counter by 1;

herein, the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter.

Specifically, according to one aspect of the present application, the first node is a UE.

Specifically, according to one aspect of the present application, the first node is a terminal of Internet of Things (IoT).

Specifically, according to one aspect of the present application, the first node is a relay.

Specifically, according to one aspect of the present application, the first node is a vehicle-mounted terminal.

Specifically, according to one aspect of the present application, the first node is an aircraft.

The present application provides a method in a first node for wireless communications, comprising:

transmitting a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and receiving the first scheduling request on a first PUCCH resource;

herein, a transmitter of the first scheduling request monitors a PDCCH in the Active Time.

Specifically, according to one aspect of the present application, a first counter is incremented by 1 along with a transmission of the first scheduling request;

herein, only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted.

Specifically, according to one aspect of the present application, a first counter is incremented by 1 along with a transmission of the first scheduling request;

herein, the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter.

Specifically, according to one aspect of the present application, transmitting a first system information block (SIB); the first system information block (SIB) indicating a first parameter, where the first parameter is measured in slot(s);

herein, a sum of a Timing Advance (TA) maintained by a transmitter of the first scheduling request and the first parameter is used for determining the first time length; the first message indicates that the Active Time comprises a period of time during which the first scheduling request is in a pending state deferred by the first time length after being transmitted.

Specifically, according to one aspect of the present application, transmitting a first system information block (SIB) and a first Media Access Control Control Element (MAC CE), the first MAC CE indicating a second parameter; the second parameter is measured in slot(s); the first SIB indicates a third parameter, the third parameter being measured in slot(s);

along with a transmission of the first scheduling request, a first counter is incremented by 1; the first counter being equal to or greater than a first threshold triggers a first random access procedure;

transmitting a random access response (RAR) for the first random access procedure;

receiving a second message on the time-frequency resources indicated by the random access response (RAR) for the first random access procedure; the second message occupying a first physical uplink shared channel (PUSCH);

herein, the second parameter and the third parameter are used together for determining a Timing Advance (TA) maintained by a transmitter of the first scheduling request; at least one of the second parameter or the third parameter is used for determining a transmission timing of the first PUSCH.

Specifically, according to one aspect of the present application, a first timer is started along with a transmission of the first scheduling request;

herein, the first scheduling request is transmitted only when the first timer is not running, and an expiration value of the first timer is equal to the first time length; the first message indicates that the Active Time comprises a period of time during which the first scheduling request is in a pending state deferred by the first time length after being transmitted.

Specifically, according to one aspect of the present application, transmitting a first signaling on the PDCCH; receiving a first MAC PDU group; the second MAC CE triggering the first scheduling request; and along with the transmission of the first MAC PDU group, the first scheduling request is canceled; the first MAC PDU group comprising at least one MAC PDU;

herein, the first MAC PDU group occupies time-frequency resources indicated by the first signaling.

Specifically, according to one aspect of the present application, transmitting a first scheduling request configuration, where a scheduling request configuration corresponding to the first scheduling request is the first scheduling request configuration;

along with a transmission of any scheduling request corresponding to the first scheduling request configuration, a first counter is incremented by 1;

herein, only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted.

Specifically, according to one aspect of the present application, transmitting a first scheduling request configuration, where a scheduling request configuration corresponding to the first scheduling request is the first scheduling request configuration;

along with a transmission of any scheduling request corresponding to the first scheduling request configuration, a first counter is incremented by 1;

herein, the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter.

Specifically, according to one aspect of the present application, the second node is a base station.

Specifically, according to one aspect of the present application, the second node is a relay.

Specifically, according to one aspect of the present application, the second node is an aircraft.

Specifically, according to one aspect of the present application, the second node is a satellite.

Specifically, according to one aspect of the present application, the second node is an access-point device.

The present application provides a first node for wireless communications, comprising:

a first receiver, receiving a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and a first transmitter, transmitting the first scheduling request on a first PUCCH resource;

the first receiver, monitoring a PDCCH in the Active Time.

The present application provides a second node for wireless communications, comprising:

a second transmitter, transmitting a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and a second receiving, receiving the first scheduling request on a first PUCCH resource;

herein, a transmitter of the first scheduling request monitors a PDCCH in the Active Time.

In one embodiment, compared with the prior art, the present application is advantageous in the following aspects:

It can reduce the time of PDCCH monitoring after transmitting a scheduling request for conserving power.

It can ensure the flexibility of scheduling, particularly a scheduling request for a retransmission, so that the base station can schedule at any time.

It can determine an Active Time in a rational manner, according to different networks, such as TN and NTN.

It can determine a start of an Active Time in a rational manner, according to properties of NTN, such as different delays brought about by different satellite orbits.

BRIEF DESCRIPTION OF THE DRAWINGS

Other features, objects and advantages of the present application will become more apparent from the detailed description of non-restrictive embodiments taken in conjunction with the following drawings:

FIG. 7 illustrates a schematic diagram of an Active Time according to one embodiment of the present application.

FIG. 8 illustrates a schematic diagram of a first message determining whether an Active Time comprises a period of time during which a first scheduling request is in a pending state after being transmitted on a PUCCH or a period of time deferred by a first time length after the first scheduling request's being transmitted and during which the first scheduling request is in a pending state according to one embodiment of the present application.

FIG. 9 illustrates a schematic diagram of a sum of a TA maintained by a first node and a first parameter used for determining a first time length according to one embodiment of the present application.

FIG. 10 illustrates a schematic diagram of a second parameter and a third parameter used together for determining an uplink transmission time of a first node according to one embodiment of the present application.

FIG. 11 illustrates a schematic diagram of at least one of a second parameter or a third parameter used for determining a first PUSCH transmission timing according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
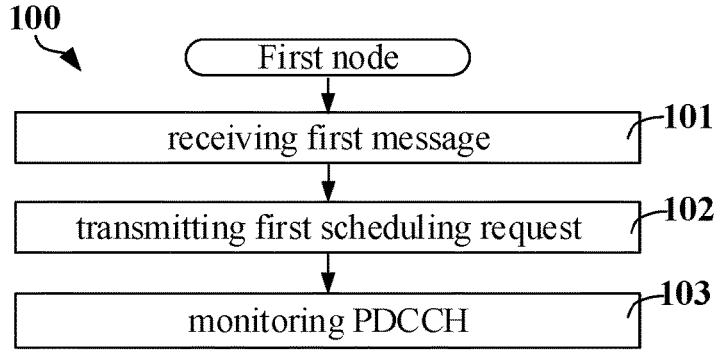
FIG. 1 illustrates a flowchart of receiving a first message, transmitting a first scheduling request and monitoring a PDCCH according to one embodiment of the present application.

Embodiment 1 illustrates a flowchart of receiving a first message, transmitting a first scheduling request and monitoring a PDCCH according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first message in step 101; and transmits a first scheduling request in step 102; and monitors a PDCCH in step 103;

herein, the first message indicates whether an Active Time comprises a period of time during which a first scheduling request is in a pending state after being transmitted on a PUCCH or a period of time deferred by a first time length after the first scheduling request's being transmitted and during which the first scheduling request is in a pending state; and the first scheduling request is transmitted on a first PUCCH resource; the first node monitors a PDCCH in the Active Time.

In one embodiment, the first node is a User Equipment (UE).

In one embodiment, a serving cell refers to a cell that the UE is camped on. Performing cell search includes that the UE searches for a suitable cell for a selected Public Land Mobile Network (PLMN) or Stand-alone Non-Public Network (SNPN), selects the suitable cell to provide available services, and monitors a control channel of the suitable cell, where the whole procedure is defined to be camped on the cell; in other words, relative to this UE, the cell being camped on is seen as a serving cell of the UE. Being camped on a cell in either RRC Idle state or RRC Inactive state is advantageous in the following aspects: enabling the UE to receive system information from a PLMN or an SNPN; after registration, if a UE hopes to establish an RRC connection or resume a suspended RRC connection, the UE can perform an initial access on a control channel of the camped cell to achieve such purpose; the network can page the UE; so that the UE can receive notifications from the Earthquake and Tsunami Warning System (ETWS) and the Commercial Mobile Alert System (CMAS).

In one embodiment, for a UE in RRC connected state without being configured with carrier aggregation/dual connectivity (CA/DC), there is only one serving cell that comprises a primary cell. For a UE in RRC connected state that is configured with carrier aggregation/dual connectivity (CA/DC), a serving cell is used for indicating a cell set comprising a Special Cell (SpCell) and all secondary cells. A Primary Cell is a cell in a Master Cell Group (MCG), i.e., an MCG cell, working on the primary frequency, and the UE performs an initial connection establishment procedure or initiates a connection re-establishment on the Primary Cell. For dual connectivity (DC) operation, a special cell refers to a Primary Cell (PCell) in an MCG or a Primary SCG Cell (PSCell) in a Secondary Cell Group (SCG); otherwise, the special cell refers to a PCell.

In one embodiment, working frequency of a Secondary Cell (SCell) is secondary frequency.

In one embodiment, separate contents in information elements (IEs) are called fields.

In one embodiment, Multi-Radio Dual Connectivity (MR-DC) refers to dual connectivity with an E-UTRA node and an NR node, or with two NR nodes.

In one embodiment, in MR-DC, a radio access node providing a control plane connection to the core network is a master node, where the master node can be a master eNB, a master ng-eNB or a master gNB.

In one embodiment, an MCG refers to a group of serving cells associated with a master node in MR-DC, including a SpCell, and optionally, one or multiple SCells.

In one embodiment, a PCell is a SpCell of an MCG.

In one embodiment, a PSCell is a SpCell of an SCG.

In one embodiment, in MR-DC, a radio access node not providing a control plane connection to the core network but providing extra resources for the UE is a secondary node. The secondary node can be an en-gNB, a secondary ng-eNB or a secondary gNB.

In one embodiment, in MR-DC, a group of serving cells associated with a secondary node is a secondary cell group (SCG), including a SpCell and, optionally, one or multiple SCells.

In one embodiment, the first PUCCH resource belongs to PUCCH resources of NTN.

In one embodiment, the first message is used for indicating NTN communications.

In one embodiment, the first message explicitly indicates NTN communications.

In one embodiment, the first message explicitly indicates non-TN communications.

In one embodiment, the first message indicates NTN communications by indicating the Ephemeris.

In one embodiment, the first message indicates NTN communications by indicating the orbit parameters.

In one embodiment, the first message indicates NTN communications by indicating the PLMN.

In one embodiment, the first message indicates NTN communications by indicating a Timing Advance (TA) that exceeds 2 ms.

In one embodiment, the first message indicates NTN communications by indicating parameters only used for NTN.

In one embodiment, the first message is or comprises an RRC message.

In one embodiment, the first message is or comprises a MAC CE message.

In one embodiment, the first message is or comprises a higher-layer message.

In one embodiment, the first message is or comprises a system message.

In one embodiment, the first message is or comprises a system information block (SIB).

In one embodiment, the first message is or comprises a SIB1.

In one embodiment, the first message is or comprises a SIB for NTN.

In one embodiment, the first message is or comprises a MIB.

In one embodiment, the first message is or comprises a RRCReconfiguration.

In one embodiment, the first message is or comprises a RRCConnectionReconfiguration.

In one embodiment, the first message comprises a rach-config.

In one embodiment, the first message comprises a rach-configdedicated.

In one embodiment, the Active Time refers in particular to Active Time.

In one embodiment, the Active Time is for a first DRX group.

In one embodiment, the Active Time is for serving cells in a first DRX group.

In one embodiment, the Active Time comprises the time while a rx-onDurationTimer for the first DRX group is running.

In one embodiment, the Active Time comprises the time while a drx-InactivityTimer for the first DRX group is running.

In one embodiment, the Active Time comprises the time while a drx-RetransmissionTimerDL of any serving cell in the first DRX group is running.

In one embodiment, the Active Time comprises the time while a drx-RetransmissionTimerUL of any serving cell in the first DRX group is running.

In one embodiment, the Active Time comprises the time while a ra-ContentionResolutionTimer is running.

In one embodiment, the Active Time comprises the time while a msgB-ResponseWindow is running.

In one embodiment, when a random access response (RAR) is successfully received, but a random access preamble corresponding to the RAR is not a random access preamble selected by a MAC entity of the first node, the Active Time comprises the time after having received a PDCCH, the PDCCH indicating that a new transmission for a C-RNTI is not received.

In one subembodiment, the C-RNTI is of the MAC entity of the first node.

In one subembodiment, the new transmission indicated by the PDCCH is for the MAC entity of the first node.

In one embodiment, the Active Time is for a first Radio Network Temporary Identity (RNTI).

In one subembodiment, the first RNTI is a G-RNTI.

In one embodiment, the Active Time comprises the time while a rx-onDurationTimerPTM for the first RNTI is running.

In one embodiment, the Active Time comprises the time while a drx-InactivityTimerPTM for the first RNTI is running.

In one embodiment, the Active Time comprises the time while a drx-RetransmissionTimerDLPTM for the first RNTI is running.

In one embodiment, the Active Time comprises the time while a drx-RetransmissionTimerULPTM for the first RNTI is running.

In one embodiment, the first node monitors a physical downlink control channel (PDCCH) in the Active Time.

In one subembodiment, the action of monitoring a PDCCH comprises blind detecting a PDCCH.

In one subembodiment, the action of monitoring a PDCCH comprises demodulating a PDCCH.

In one subembodiment, the action of monitoring a PDCCH comprises attempting reception or blind detection of a PDCCH on a given search space.

In one subembodiment, the action of monitoring a PDCCH comprises attempting reception or blind detection of a PDCCH on a given CORSET.

In one subembodiment, the action of monitoring a PDCCH comprises attempting decoding of bits received by a PDCCH.

In one subembodiment, the action of monitoring a PDCCH comprises attempting decoding of bits received by a PDCCH and performing CRC of an output by the decoding.

In one subembodiment, the action of monitoring a PDCCH comprises performing a measurement or channel estimation of a PDCCH.

In one subembodiment, the action of monitoring a PDCCH comprises receiving a PDCCH.

In one subembodiment, the action of monitoring a PDCCH comprises receiving a signaling transmitted on a PDCCH.

In one subembodiment, the action of monitoring a PDCCH comprises receiving a PDCCH using an active TCI state.

In one embodiment, the pending state refers to pending.

In one embodiment, the first scheduling request is a scheduling request (SR).

In one embodiment, the first PUCCH resource is a PUCCH resource of an SR transmission occasion.

In one embodiment, the first PUCCH resource is a resource of a PUCCH.

In one embodiment, the first PUCCH resource is a resource in a PUCCH resource set.

In one embodiment, the first PUCCH resource is configured by the first message.

In one embodiment, the first PUCCH resource is configured by a PUCCH-Config.

In one embodiment, the first scheduling request is for a buffer status report (BSR).

In one embodiment, the first scheduling request is for a beam failure recovery (BFR).

In one embodiment, the first scheduling request is for a listen before talk (LBT) failure recovery.

In one embodiment, when the first message indicates that an Active Time comprises the time during which a scheduling request is in a pending state after being transmitted on a PUCCH, the Active Time comprises the time during which the first scheduling request is in a pending state after the first PUCCH resource; when the first message indicates that an Active Time comprises the time deferred by a first time length after the scheduling request's being transmitted and during which the first scheduling request is in a pending state, the Active Time comprises the time after being deferred from the first PUCCH resource by the first time length and during which the first scheduling request is in a pending state.

In one embodiment, the first time length is greater than 0 ms.

In one embodiment, the first message indicates a first time length.

In one embodiment, the first time length is no smaller than 1 slot.

In one embodiment, the Active Time is for a first DRX group, where the PDCCH is transmitted on a serving cell of the first DRX group; the first node does not monitor the PDCCH outside the Active Time.

In one embodiment, the first node only monitors the PDCCH in the Active Time.

In one embodiment, the first node is only required to monitor the PDCCH in the Active Time.

In one embodiment, when the first message indicates that the Active Time comprises a period of time deferred by the first time length after the first scheduling request's being transmitted and during which the first scheduling request is in a pending state, if there is no other available condition for determining an Active Time that is satisfied, the Active Time does not comprise the period of time of/equal to the first time length from the first scheduling request's being transmitted.

In one embodiment, when the first message indicates that the Active Time comprises a period of time deferred by the first time length after the first scheduling request's being transmitted and during which the first scheduling request is in a pending state, if there is no other available timer for determining an Active Time that is running, the Active Time does not comprise the period of time of/equal to the first time length from the first scheduling request's being transmitted.

In one subembodiment, the first node does not perform a random access.

In one subembodiment, the following condition is not satisfied: having received a random access response (RAR) successfully, but a random access preamble corresponding to the RAR being not a random access preamble selected by a MAC entity of a first node, and having received a PDCCH which indicates that a new transmission for a first C-RNTI is not received.

In one embodiment, when the first message indicates that the Active Time comprises a period of time during which the first scheduling request is in a pending state deferred by the first time length after being transmitted, the Active Time does not comprise the period of time from the first scheduling request's being transmitted to the first time length, and the Active Time is for a first DRX group, and a rx-onDurationTimer for the first DRX group is not running; and a drx-InactivityTimer for the first DRX group is not running; and a drx-RetransmissionTimerDL for any serving cell in the first DRX group is not running; and a drx-RetransmissionTimerUL for any serving cell in the first DRX group is not running; and a ra-ContentionResolutionTimer is running; and a msgB-ResponseWindow is running; and a first receiving condition is unsatisfied.

In one subembodiment, the first receiving condition is: having received a random access response (RAR) successfully, but a random access preamble corresponding to the RAR being not a random access preamble selected by a MAC entity of a first node, and having received a PDCCH which indicates that a new transmission for a first C-RNTI is not received.

In one subembodiment, the first C-RNTI is a C-RNTI of the first node.

In one subembodiment, the first C-RNTI is of a MAC entity of the first node.

In one subembodiment, the new transmission for the first C-RNTI is for a MAC entity of the first node.

In one subembodiment, a drx-onDurationTimerPTM for any G-RNTI is not running.

In one subembodiment, a drx-InactivityTimerPTM for any G-RNTI is not running.

In one subembodiment, a drx-RetransmissionTimerDLPTM for any G-RNTI is not running.

In one subembodiment, a drx-RetransmissionTimerULPTM for any G-RNTI is not running.

In one embodiment, along with a transmission of the first scheduling request, the first node increments a first counter by 1;

herein, only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted.

In one subembodiment, the first counter is incremented only when the first scheduling request is transmitted.

In one subembodiment, the first node does not use or is not configured with LBT.

In one subembodiment, the first node does not use or is not configured with Shared Spectrum.

In one subembodiment, the first node does not receive a LBT failure indication from lower layers.

In one subembodiment, the first node increments the first counter by 1 only when not having received a LBT failure indication from lower layers.

In one subembodiment, the first counter is for the first scheduling request.

In one subembodiment, the first counter is for an SR configuration corresponding to the first scheduling request.

In one subembodiment, the first counter is SR_COUNTER.

In one subembodiment, a possible value of the first counter is an integer.

In one subembodiment, when the first scheduling request is transmitted, a possible value of the first counter is greater than 0.

In one subembodiment, when the first scheduling request is triggered, and the SR configuration corresponding to the first scheduling request has no other pending SR, the first counter is set to 0.

In one subembodiment, the sentence that only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted means that: when the first counter is equal to 1, the first message indicates whether the Active Time comprises a period of time during which the first scheduling request is in a pending state after being transmitted on a PUCCH or a period of time during which the first scheduling request is in a pending state deferred by the first time length after being transmitted; when the first counter is unequal to 1, the first message does not indicate whether the Active Time comprises a period of time during which the first scheduling request is in a pending state after being transmitted on a PUCCH or a period of time during which the first scheduling request is in a pending state deferred by the first time length after being transmitted.

In one subembodiment, the sentence that only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted means that: when the first counter is equal to 1, the first message indicates that the Active Time comprises a period of time during which the first scheduling request is in a pending state deferred by the first time length after being transmitted; when the first counter is unequal to 1, the Active Time comprises a period of time during which the first scheduling request is in a pending state after being transmitted on a PUCCH.

In one subembodiment, the sentence that only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted means that: when the first counter is equal to 1, the Active Time comprises a period of time during which the first scheduling request is in a pending state deferred by the first time length after being transmitted; when the first counter is unequal to 1, the Active Time comprises a period of time during which the first scheduling request is in a pending state after being transmitted on a PUCCH.

In one subembodiment, the sentence that only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted means that: when the first counter is equal to 1, the Active Time comprises a period of time during which the first scheduling request is in a pending state deferred by the first time length after being transmitted; when the first counter is unequal to 1, the Active Time comprises a period of time during which the first scheduling request is in a pending state after being transmitted on a PUCCH; the first message indicates the first time length.

In one embodiment, the above method is advantageous in that when a scheduling request is transmitted for the first time, the base station, upon its reception of this scheduling request, can schedule in a flexible manner, for instance, at any time; after a scheduling request is retransmitted (including other SR configured by the same scheduling request), the base station can transmit a scheduling signaling for the first transmitted scheduling request, so that as soon as the retransmitted scheduling request (including other SR configured by the same scheduling request) has been transmitted, a scheduling signaling for the previously transmitted scheduling request is likely to be received from the base station, therefore, the scheduling of the base station becomes less restricted, which ensures the scheduling flexibility.

In one embodiment, along with a transmission of the first scheduling request, the first node increments a first counter by 1;

herein, the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter.

In one subembodiment, the first counter is incremented only when the first scheduling request is transmitted.

In one subembodiment, the first node does not use or is not configured with LBT.

In one subembodiment, the first node does not use or is not configured with Shared Spectrum.

In one subembodiment, the first node does not receive a LBT failure indication from lower layers.

In one subembodiment, the first node increments the first counter by 1 only when not having received a LBT failure indication from lower layers.

In one subembodiment, the first counter is for the first scheduling request.

In one subembodiment, the first counter is for an SR configuration corresponding to the first scheduling request.

In one subembodiment, the first counter is SR_COUNTER.

In one subembodiment, a possible value of the first counter is an integer.

In one subembodiment, when the first scheduling request is transmitted, a possible value of the first counter is greater than 0.

In one subembodiment, when the first scheduling request is triggered, and the SR configuration corresponding to the first scheduling request has no other pending SR, the first counter is set to 0.

In one subembodiment, the sentence that the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter means that: whatever value the first counter takes, the first message indicates whether the Active Time comprises a period of time during which the first scheduling request is in a pending state after being transmitted on a PUCCH or a period of time during which the first scheduling request is in a pending state deferred by the first time length after being transmitted.

In one subembodiment, the sentence that the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter means that: whatever desirable value the first counter takes, the first message indicates whether the Active Time comprises a period of time during which the first scheduling request is in a pending state after being transmitted on a PUCCH or a period of time during which the first scheduling request is in a pending state deferred by the first time length after being transmitted.

In one embodiment, the above method is advantageous in that after each transmission of scheduling request there might be a period of time that does not belong to the Active Time, which thus saves energy.

In one embodiment, along with a transmission of the first scheduling request, the first node starts a first timer; herein, the first scheduling request is transmitted only when the first timer is not running, and an expiration value of the first timer is equal to the first time length; the first message indicates that the Active Time comprises a period of time during which the first scheduling request is in a pending state deferred by the first time length after being transmitted.

In one subembodiment, the first timer is started only when the first scheduling request is transmitted.

In one subembodiment, the first node does not use or is not configured with LBT.

In one subembodiment, the first node does not use or is not configured with Shared Spectrum.

In one subembodiment, the first node does not receive a LBT failure indication from lower layers.

In one subembodiment, the first node increments the first timer by 1 only when not having received a LBT failure indication from lower layers.

In one subembodiment, the first timer is for the first scheduling request.

In one subembodiment, the first timer is for an SR configuration corresponding to the first scheduling request.

In one subembodiment, the first timer is a sr-Prohibit-Timer.

In one subembodiment, a possible value of the first timer is an integer.

In one subembodiment, when the first scheduling request is triggered, and the SR configuration corresponding to the first scheduling request has no other pending SR, the first counter is set to 0.

In one subembodiment, when the first scheduling request is canceled, the first timer is stopped.

In one subembodiment, the first timer and the first scheduling request correspond to a same SR configuration.

In one subembodiment, during the time while the first timer is running, the first node does not transmit the first scheduling request.

In one embodiment, an expiration value of the first timer is used to determine the first time length.

In one embodiment, the first message indicates an expiration value of the first timer.

In one embodiment, a sum of an expiration value of the first timer and an offset is equal to the first time length.

In one embodiment, the first PUCCH resource is a valid PUCCH resource.

In one embodiment, the first PUCCH resource belongs to an active BWP.

In one embodiment, the first scheduling request is a prioritized scheduling request.

In one embodiment, after being triggered a scheduling request will be in a pending state till cancellation.

In one subembodiment, the scheduling request includes the first scheduling request.

In one embodiment, the method proposed by the present application is only applicable to NTN.

In one subembodiment, the first message indicates that the current network is NTN.

In one subembodiment, the first SIB indicates that the current network is NTN.

Embodiment 2

Figure 2:
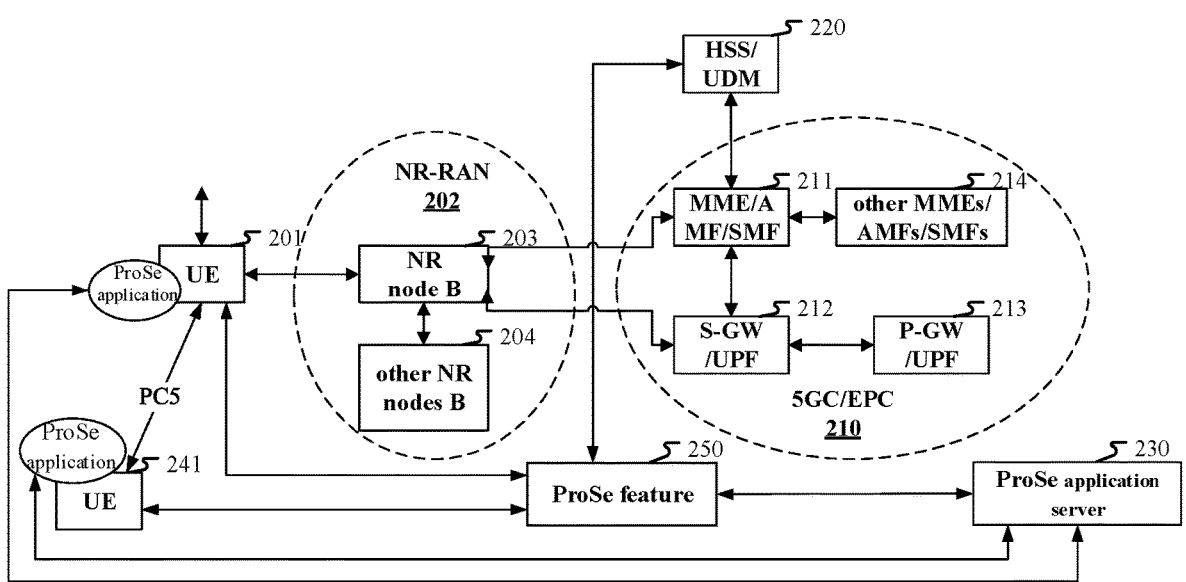
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241, an NG-RAN 202, a 5G-Core Network/Evolved Packet Core (5GC/EPC) 210, a Home Subscriber Server/Unified Data Management (HSS/UDM) 220, a ProSe feature 250 and ProSe application server 230. The V2X communication architecture may be interconnected with other access networks. For simple description, the entities/interfaces are not shown. As shown in FIG. 2, the V2X communication architecture provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an SI/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 and the UE 241 are connected by a PC5 Reference Point.

In one embodiment, the ProSe feature 250 is connected to the UE 201 and the UE 241 respectively by PC3 Reference Points.

In one embodiment, the ProSe feature 250 is connected to the ProSe application server 230 by a PC2 Reference Point.

In one embodiment, the ProSe application server 230 is connected with the ProSe application of the UE 201 and the ProSe application of the UE 241 respectively via a PC1 Reference Point.

In one embodiment, the first node in the present application is the UE 201.

In one embodiment, the second node in the present application is the gNB 203.

In one embodiment, a radio link from the UE 201 to the NR Node B is an uplink.

In one embodiment, a radio link from the NR Node B to the UE 201 is a downlink.

In one embodiment, the UE 201 supports relay transmission.

In one embodiment, the UE 201 is a means of transportation including automobile.

In one embodiment, the gNB 203 is a MacroCellular base station.

In one embodiment, the gNB 203 is a flight platform.

In one embodiment, the gNB 203 is satellite equipment.

In one embodiment, the gNB 203 is NTN equipment.

Embodiment 3

Figure 3:
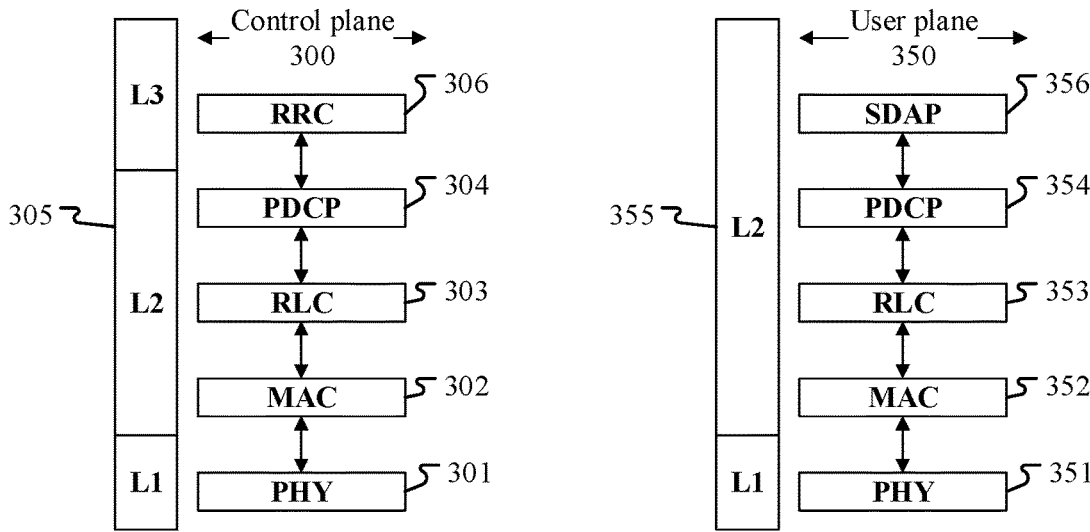
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer 307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first message in the present application is generated by the RRC 306 or the MAC 302.

In one embodiment, the second message in the present application is generated by the RRC 306 or the MAC 302.

In one embodiment, the first scheduling request in the present application is generated by the MAC 302 or the PHY 301.

In one embodiment, the first signaling in the present application is generated by the PHY 301.

In one embodiment, the first SIB in the present application is generated by the RRC 306.

In one embodiment, the first MAC CE in the present application is generated by the MAC 302.

In one embodiment, the second MAC CE in the present application is generated by the MAC 302.

In one embodiment, the first MAC PDU group in the present application is generated by the MAC 302.

Embodiment 4

Figure 4:
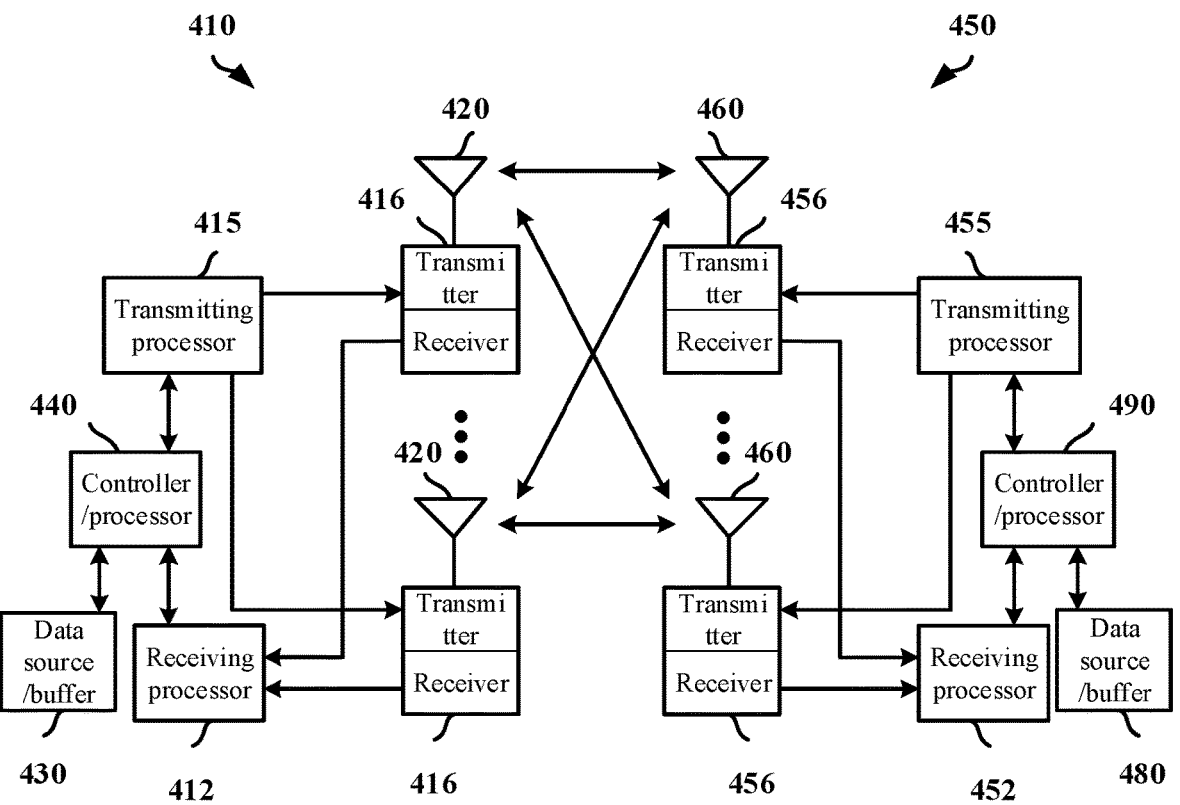
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 firstly converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and transmits the first scheduling request on a first PUCCH resource; and monitors a PDCCH in the Active Time.

In one embodiment, the first communication node 450 comprises a memory that stores a computer readable instruction program, the computer readable instruction program generates actions when executed by at least one processor, which include: receiving a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and transmitting the first scheduling request on a first PUCCH resource; and monitoring a PDCCH in the Active Time.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and receives the first scheduling request on a first PUCCH resource; herein, a transmitter of the first scheduling request monitors a PDCCH in the Active Time.

In one embodiment, the second communication device 410 comprises a memory that stores a computer readable instruction program, the computer readable instruction program generates actions when executed by at least one processor, which include: transmitting a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and receiving the first scheduling request on a first PUCCH resource; herein, a transmitter of the first scheduling request monitors a PDCCH in the Active Time.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a vehicle-mounted terminal.

In one embodiment, the first communication device 450 is a relay.

In one embodiment, the second communication device 410 is a base station.

In one embodiment, the second communication device 410 is a satellite platform.

In one embodiment, the receiver 456 (comprising the antenna 460), the receiving processor 452 and the controller/processor 490 are used for receiving the first message in the present application.

In one embodiment, the receiver 456 (comprising the antenna 460), the receiving processor 452 and the controller/processor 490 are used for receiving the first signaling in the present application.

In one embodiment, the receiver 456 (comprising the antenna 460), the receiving processor 452 and the controller/processor 490 are used for receiving the first SIB in the present application.

In one embodiment, the receiver 456 (comprising the antenna 460), the receiving processor 452 and the controller/processor 490 are used for receiving the first MAC CE in the present application.

In one embodiment, the transmitter 456 (comprising the antenna 460), the transmitting processor 455 and the controller/processor 490 are used for transmitting the first scheduling request in the present application.

In one embodiment, the transmitter 456 (comprising the antenna 460), the transmitting processor 455 and the controller/processor 490 are used for transmitting the second message in the present application.

In one embodiment, the transmitter 456 (comprising the antenna 460), the transmitting processor 455 and the controller/processor 490 are used for transmitting the second MAC CE in the present application.

In one embodiment, the transmitter 456 (comprising the antenna 460), the transmitting processor 455 and the controller/processor 490 are used for transmitting the first MAC PDU group in the present application.

In one embodiment, the transmitter 416 (comprising the antenna 420), the transmitting processor 412 and the controller/processor 440 are used for transmitting the first message in the present application.

In one embodiment, the transmitter 416 (comprising the antenna 420), the transmitting processor 412 and the controller/processor 440 are used for transmitting the first signaling in the present application.

In one embodiment, the transmitter 416 (comprising the antenna 420), the transmitting processor 412 and the controller/processor 440 are used for transmitting the first SIB in the present application.

In one embodiment, the transmitter 416 (comprising the antenna 420), the transmitting processor 412 and the controller/processor 440 are used for transmitting the first MAC CE in the present application.

In one embodiment, the receiver 416 (comprising the antenna 420), the receiving processor 412 and the controller/processor 440 are used for receiving the second message in the present application.

In one embodiment, the receiver 416 (comprising the antenna 420), the receiving processor 412 and the controller/processor 440 are used for receiving the second MAC CE in the present application.

In one embodiment, the receiver 416 (comprising the antenna 420), the receiving processor 412 and the controller/processor 440 are used for receiving the first MAC PDU group in the present application.

In one embodiment, the receiver 416 (comprising the antenna 420), the receiving processor 412 and the controller/processor 440 are used for receiving the first scheduling request in the present application.

Embodiment 5

Figure 5:
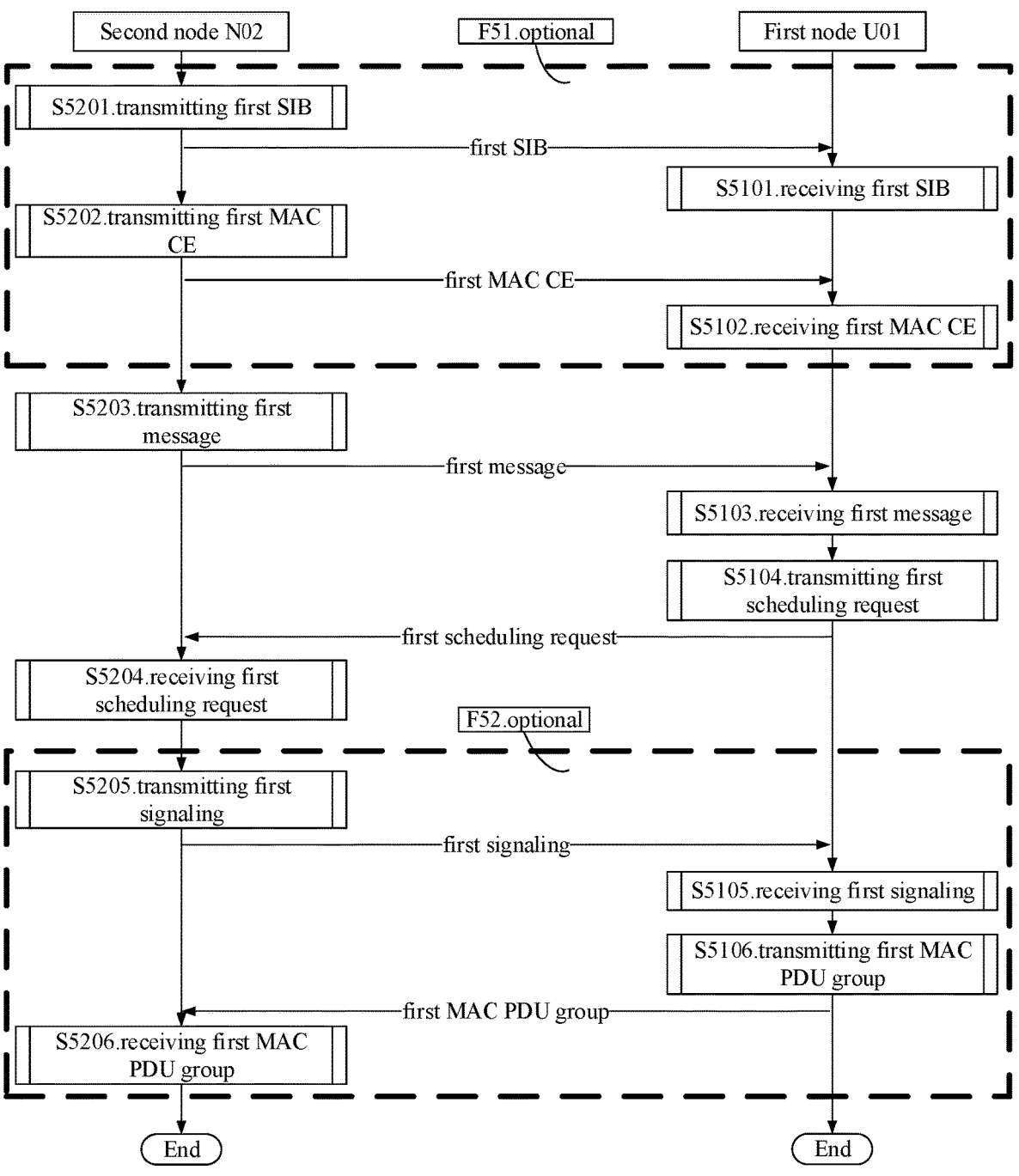
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to the first node in the present application, and N02 corresponds to the second node in the present application. It should be particularly noted that the sequence illustrated herein does not set any limit on the orders in which signals are transmitted and implementations in this present application. Herein, steps in F51 and F52 are optional.

The first node U01 receives a first system information block (SIB) in step S5101; and receives a first MAC CE in step S5102; receives a first message in step S5103; transmits a first scheduling request in step S5104; and receives a first signaling in step S5105; and transmits a first MAC PDU group in step S5106.

The second node N02 transmits a first SIB in step S5201; and transmits a first MAC CE in step S5202; transmits a first message in step S5203; receives a first scheduling request in step S5204; transmits a first signaling in step S5205; and receives a first MAC PDU group in step S5206.

In Embodiment 5, the first message indicates whether an Active Time comprises a period of time during which a first scheduling request is in a pending state after being transmitted on a PUCCH or a period of time deferred by a first time length after the first scheduling request's being transmitted and during which the first scheduling request is in a pending state; the first node U01 transmits the first scheduling request on a first PUCCH resource; monitors a PDCCH in the Active Time.

In one embodiment, the first system information block is a SIB.

In one embodiment, the first system information block includes a master information block (MIB).

In one embodiment, the first system information block includes a SIB1.

In one embodiment, the first system information block includes a SIBx, where the SIBx refers to SIB1 and/or SIB2 and/or SIB3 and/or so on.

In one embodiment, the first system information block is broadcast.

In one embodiment, the first system information block is unicast.

In one embodiment, the first message comprises the first system information block.

In one embodiment, the first system information block (SIB) indicates a first parameter, where the first parameter is measured in slot(s).

In one subembodiment, the first parameter is $k_{mac}$.

In one subembodiment, the first parameter is $k_{-mac}$.

In one subembodiment, a name of the first parameter includes k and/or mac.

In one subembodiment, the first system information block explicitly indicates the first parameter.

In one subembodiment, a sum of the first parameter and a Timing Advance (TA) maintained by the first node is used for determining a round trip time of a radio signal.

In one subembodiment, a sum of the first parameter and a Timing Advance (TA) maintained by the first node is equal to a round trip time of a radio signal.

In one subembodiment, a sum of a Timing Advance (TA) maintained by the first node and the first parameter is used for determining the first time length.

In one subembodiment, the first time length is equal to a sum of a Timing Advance (TA) maintained by the first node and the first parameter.

In one subembodiment, the first time length is equal to a sum of a Timing Advance (TA) maintained by the first node, the first parameter and a given offset.

In one embodiment, the first MAC CE is a MAC control element (CE).

In one embodiment, the first MAC CE is or comprises a random access response (RAR).

In one embodiment, the first MAC CE is or comprises a TA-related MAC CE.

In one embodiment, the first MAC CE is or comprises a Timing Advance Command MAC CE.

In one embodiment, the first MAC CE is or comprises an Absolute Timing Advance Command MAC CE.

In one embodiment, the first MAC CE indicates a second parameter; the second parameter is measured in slot(s).

In one subembodiment, the second parameter is a timing advance command (TAC).

In one subembodiment, the second parameter is used for determining or adjusting a TA of the first node.

In one embodiment, the first node U01 generates a second MAC CE; and as a response to at least generating the second MAC CE, triggers the first scheduling request; and transmits a first MAC PDU group in step S5106; and along with the transmission of the first MAC PDU group, cancels the first scheduling request;

herein, the action of monitoring a physical downlink control channel (PDCCH) in the Active Time comprises receiving a first signaling; the first MAC PDU group occupies time-frequency resources indicated by the first signaling.

In one subembodiment, the second MAC CE is a BSR MAC CE.

In one subembodiment, a MAC entity of the first node U01 has valid uplink data to be transmitted, so the second MAC CE is generated according to an amount/a volume of the uplink data to be transmitted; the second MAC CE is a Buffer Status Report MAC CE, and the first node U01 has no sufficient uplink resources for transmitting the second MAC CE; so, the first scheduling request is triggered.

In one subembodiment, uplink resources indicated by the first signaling are sufficient enough for transmitting the uplink data to be transmitted.

In one subembodiment, along with the first signaling indicating time-frequency resources sufficient enough for transmitting the uplink data to be transmitted, the first scheduling request is canceled.

In one subembodiment, along with the first signaling indicating time-frequency resources sufficient enough for transmitting the uplink data to be transmitted, the second MAC CE is canceled.

In one subembodiment, along with a transmission of the first MAC PDU group is equivalent to along with the first signaling indicating time-frequency resources sufficient enough for transmitting the uplink data to be transmitted.

In one subembodiment, the first MAC PDU group comprises the uplink data to be transmitted.

In one subembodiment, the first signaling is downlink control information (DCI).

In one subembodiment, the first signaling is a DCI in format 0_0.

In one subembodiment, the first signaling is a configured grant.

In one subembodiment, the action of monitoring a PDCCH comprises making an attempt of reception of the PDCCH, where in the attempt of the reception, the first signaling is received.

In one subembodiment, the action of monitoring a PDCCH comprises performing a blind detection of the PDCCH, where in the blind detection, the first signaling is received.

In one subembodiment, the first MAC PDU group only comprises one MAC PDU.

In one embodiment, the first node U01 generates a second MAC CE; and as a response to at least generating the second MAC CE, triggers the first scheduling request; and transmits a first MAC PDU group in step S5106; and along with the transmission of the first MAC PDU group, cancels the first scheduling request;

herein, the action of monitoring a PDCCH in the Active Time comprises receiving a first signaling; the first MAC PDU group occupies time-frequency resources indicated by the first signaling.

In one subembodiment, the second MAC CE is a BSR MAC CE.

In one subembodiment, the first signaling is downlink control information (DCI).

In one subembodiment, the first signaling is a DCI in format 0_0.

In one subembodiment, the first signaling is a configured grant.

In one subembodiment, the action of monitoring a PDCCH comprises making an attempt of reception of the PDCCH, where in the attempt of the reception, the first signaling is received.

In one subembodiment, the action of monitoring a PDCCH comprises performing a blind detection of the PDCCH, where in the blind detection, the first signaling is received.

In one subembodiment, the first MAC PDU group only comprises one MAC PDU.

In one subembodiment, the second MAC CE is or comprises a BSR MAC CE.

In one subembodiment, the second MAC CE is or comprises a BFR MAC CE.

In one subembodiment, the second MAC CE is or comprises a LBT failure MAC CE.

In one subembodiment, the second MAC CE is or comprises a BFR-related MAC CE.

In one subembodiment, the second MAC CE is or comprises a TRP-related BFR MAC CE.

In one subembodiment, the second MAC CE is or comprises a MAC CE related to a BFR of a TRP.

In one subembodiment, the second MAC CE is generated, and a UL-SCH has no sufficient resources for transmitting the second MAC CE, hence triggering of the first scheduling request.

In one subembodiment, the second MAC CE is generated, and a UL-SCH has no sufficient resources for transmitting a MAC PDU that comprises the second MAC CE, so the first scheduling request is triggered.

In one subembodiment, uplink resources indicated by the first signaling are sufficient enough for transmitting the second MAC CE or for transmitting a MAC PDU that comprises the second MAC CE.

In one subembodiment, the first MAC PDU group comprises the second MAC CE.

In one subembodiment, along with the transmission of the first MAC PDU group, the first scheduling request is canceled.

Embodiment 6

Figure 6:
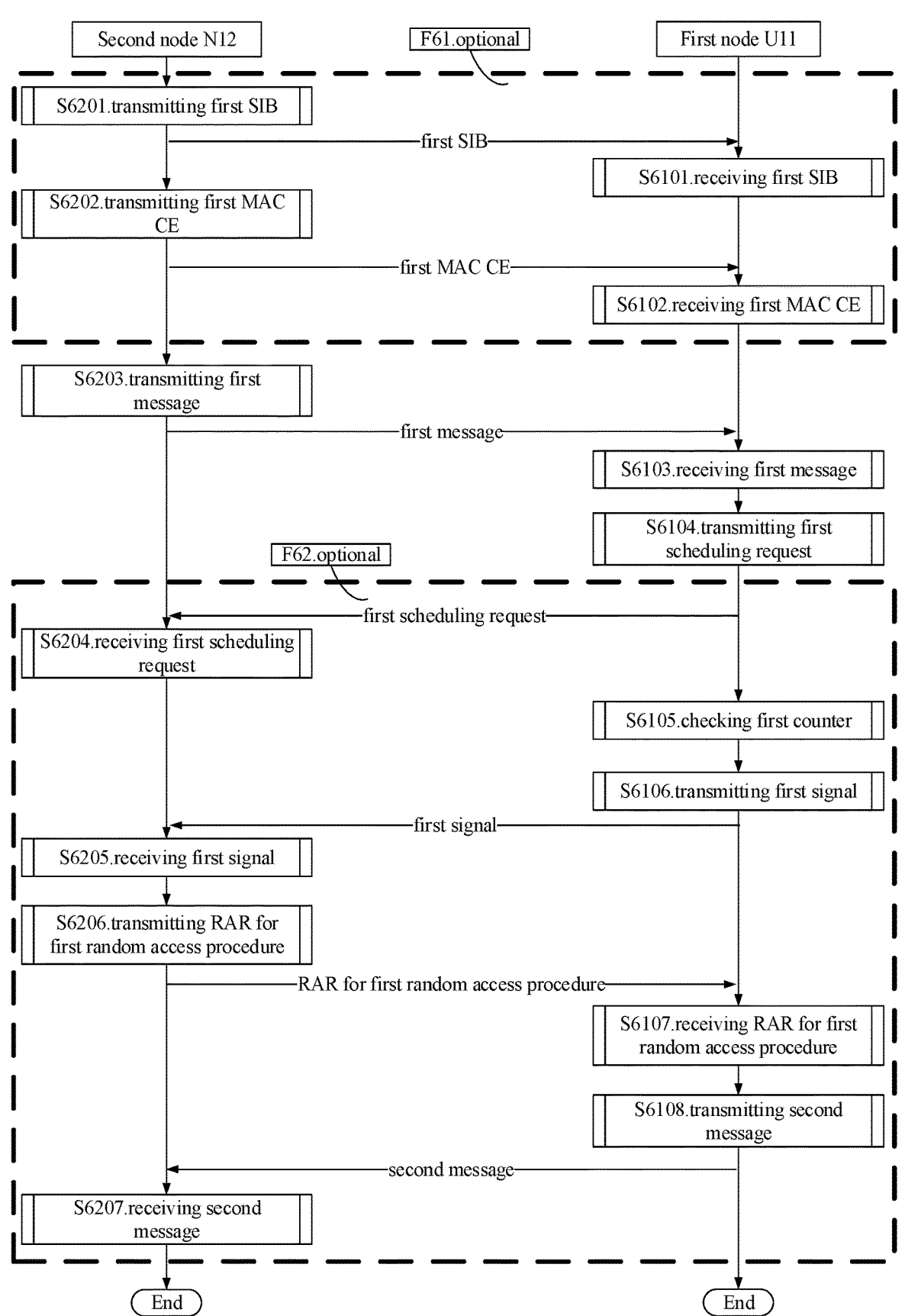
FIG. 6 illustrates a flowchart of radio signal transmission according to one embodiment of the present application.

Embodiment 6 illustrates a flowchart of radio signal transmission according to one embodiment of the present application, as shown in FIG. 6. In FIG. 6, U11 corresponds to the first node in the present application, and N12 corresponds to the second node in the present application. It should be particularly noted that the sequence illustrated herein does not set any limit on the orders in which signals are transmitted and implementations in this present application. Herein, steps in F61 and F62 are optional. With the Embodiment 5 as the foundation, anything necessary but not explained in Embodiment 6 can refer to Embodiment 5.

The first node N11 receives a first system information block (SIB) in step S6101; and receives a first MAC CE in step S6102; receives a first message in step S6103; transmits a first scheduling request in step S6104; and checks a first counter in step S6105; transmits a first signal in step S6106; receives a random access response (RAR) for a first random access procedure in step S6107; and transmits a second message in step S6108.

The second node N12 transmits a first SIB in step S6201; and transmits a first MAC CE in step S6202; transmits a first message in step S6203; receives a first scheduling request in step S6204; and receives a first signal in step S6205; transmits a random access response (RAR) for a first random access procedure in step S6206; and receives a second message in step S6207.

In Embodiment 6, the step S6204 is optional, which means that it is possible for the second node N12 to receive the first scheduling request transmitted by the first node U11 in step S6104, but it is also possible that the second node N12 does not receive the first scheduling request.

In one embodiment, the first node U11 receives a first system information block (SIB) and a first Media Access Control Control Element (MAC CE), the first MAC CE indicating a second parameter; the second parameter is measured in slot(s); the first SIB indicates a third parameter, the third parameter being measured in slot(s);

the first node increments a first counter by 1 along with a transmission of the first scheduling request; and as a response to that the first counter is equal to a first threshold, initiating a first random access procedure; the action of initiating a first random access procedure comprises transmitting a second message on time-frequency resources indicated by a random access response (RAR) for the first random access procedure; the second message occupies a first physical uplink shared channel (PUSCH);

herein, the second parameter and the third parameter are used together for determining an uplink transmission time of the first node; at least one of the second parameter or the third parameter is used for determining a transmission timing of the first PUSCH.

In one embodiment, along with a transmission of the first scheduling request, incrementing a first counter by 1; and as a response to that the first counter is equal to a first threshold, initiating a first random access procedure; the action of initiating a first random access procedure comprises: transmitting a first signal, and receiving a random access response (RAR) for the first random access procedure, and transmitting a second message on time-frequency resources indicated by the RAR for the first random access procedure.

In one embodiment, the first scheduling request can be transmitted multiple times and/or received multiple times.

In one embodiment, along with a transmission of the first scheduling request, a first counter is incremented by 1.

In one subembodiment, the first counter is SR_COUNTER.

In one embodiment, along with each transmission of the first scheduling request, a first counter is incremented by 1.

In one subembodiment, the first counter is SR_COUNTER.

In one embodiment, along with each transmission of any scheduling request of an SR configuration corresponding to the first scheduling request, a first counter is incremented by 1.

In one subembodiment, the first counter is SR_COUNTER.

In one embodiment, the action of checking a first counter in step S6105 means to check whether a value of the first counter is smaller than a sr-TransMax; that the first counter is no smaller than the first threshold triggers that the first node U11 initiates the first random access procedure.

In one subembodiment, the first counter is smaller than the first threshold, thus the first node U11 transmits the first scheduling request on a second PUCCH resource.

In one subembodiment, the first counter is smaller than the first threshold, thus the first node U11 transmits any scheduling request corresponding to an SR configuration of the first scheduling request on a second PUCCH resource.

In one embodiment, a result of checking a first counter in step S6105 is that a value of the first counter is greater than or equal to sr-TransMax.

In one subembodiment, as a response to the first counter being equal to a first threshold, the first node U11 initiates the first random access procedure; the first threshold is sr-TransMax.

In one embodiment, the first random access procedure comprises transmitting the first signal.

In one embodiment, the first signal is or comprises a random access preamble.

In one embodiment, the first signal is or comprises an msgA.

In one embodiment, the random access response (RAR) for the first random access procedure is an RAR for the first signal.

In one embodiment, the random access response (RAR) for the first random access procedure comprises a signaling for a C-RNTI received on a PDCCH.

In one subembodiment, the C-RNTI is a C-RNTI of the first node U11.

In one embodiment, the random access response (RAR) for the first random access procedure comprises an RAR for the first signal.

In one embodiment, the random access response (RAR) for the first random access procedure indicates time-frequency resources of the first PUSCH, the first PUSCH used for transmitting the second message.

In one embodiment, the second message is an msg3.

In one embodiment, the second message is an msgB.

In one embodiment, the second message comprises a second MAC CE, the second MAC CE being a MAC CE that triggers the first scheduling request.

In one embodiment, the first counter being no smaller than the first threshold means that there occurs an SR failure.

In one embodiment, the first MAC CE is a MAC control element (CE).

In one embodiment, the first MAC CE is or comprises a random access response (RAR).

In one embodiment, the first MAC CE is or comprises a TA-related MAC CE.

In one embodiment, the first MAC CE is or comprises a Timing Advance Command MAC CE.

In one embodiment, the first MAC CE is or comprises an Absolute Timing Advance Command MAC CE.

In one embodiment, the first MAC CE indicates a second parameter; the second parameter is measured in slot(s).

In one subembodiment, the second parameter is a timing advance command (TAC).

In one subembodiment, the second parameter is used for determining or adjusting a TA of the first node.

In one embodiment, the first system information block (SIB) indicates a third parameter, where the third parameter is measured in slot(s).

In one subembodiment, the third parameter is $k_{offset}$, or $K_{offset}$, or K_offset.

In one subembodiment, the third parameter is $k_{-offset}$.

In one subembodiment, the third parameter is $k_{offset(1)}$.

In one subembodiment, the third parameter is $k_{offset,1}$.

In one subembodiment, the third parameter is $k_{-offset, UE}$.

In one subembodiment, a name of the third parameter includes k and/or offset and/or ue.

In one subembodiment, the third parameter is $N_{TA, UE-specific}$.

In one subembodiment, the third parameter is $N_{TA, specific}$.

In one subembodiment, the third parameter is $N_{TA, common}$.

In one embodiment, along with a transmission of the first scheduling request, the first node U01 increments a first counter by 1.

In one embodiment, each time when the first scheduling request is transmitted, the first counter is incremented by 1.

In one subembodiment, once the first counter is incremented by 1, the first scheduling request is surely transmitted.

In one subembodiment, once the first counter is incremented by 1, any scheduling request belonging to an SR configuration of the first scheduling request is surely transmitted.

In one subembodiment, when any scheduling request belonging to an SR configuration of the first scheduling request is surely transmitted, and only when the first-type failure indication is not received will the first counter be incremented by 1.

In one subembodiment, when any scheduling request belonging to an SR configuration of the first scheduling request is surely transmitted, and only when the first-type failure indication is not received, and the first counter is smaller than the first threshold, will the first counter be incremented by 1.

In one subembodiment, when the first scheduling request is surely transmitted, and only when the first-type failure indication is not received, and the first counter is smaller than the first threshold, will the first counter be incremented by 1.

In one subembodiment, the first-type failure indication is a LBT failure indication.

In one subembodiment, the first threshold is sr-TransMax.

Embodiment 7

Embodiment 7 illustrates a schematic diagram of an Active Time according to one embodiment of the present application, as shown in FIG. 7.

In one embodiment, the first time length is greater than 0.

In one embodiment, the first time length is longer than 1 slot.

In one embodiment, the first time length is longer than 1 OFDM symbol.

In one embodiment, the first time length is longer than 1 ms.

In one embodiment, the first time length is longer than 1 subframe.

In one embodiment, the first time length is longer than 1 frame.

In one embodiment, the first message comprises and/or indicates the first time length.

In one embodiment, the first system information block (SIB) comprises the first time length.

In one embodiment, the first message comprises parameters used for determining the first time length.

In one embodiment, the first message indicates a first parameter, the first parameter used for determining the first time length.

In one subembodiment, a sum of the first parameter and a Timing Advance (TA) maintained by the first node is used for determining the first time length.

In one subembodiment, a sum of the first parameter and a Timing Advance (TA) maintained by the first node is determined to be the first time length.

In one subembodiment, the first parameter is kmac.

In one embodiment, the first node transmits the first scheduling request at a time t0.

In one subembodiment, the time t0 is a time at which the first scheduling request is transmitted.

In one subembodiment, the time t0 is a time at which a transmission of the first scheduling request is started.

In one subembodiment, the time t0 is a time at which a transmission of the first scheduling request is completed.

In one subembodiment, the time t0 is a time at which time-frequency resources occupied by the first scheduling request starts.

In one subembodiment, the time t0 is a time at which time-frequency resources occupied by the first scheduling request ends.

In one subembodiment, the time t0 is a time of a first OFDM symbol occupied by the first scheduling request.

In one subembodiment, the time t0 is a time of a last OFDM symbol occupied by the first scheduling request.

In one subembodiment, the time t0 is a start or an end time of a first OFDM symbol occupied by the first scheduling request.

In one subembodiment, the time t0 is a start or an end time of a last OFDM symbol occupied by the first scheduling request.

In one embodiment, the Active Time starts after deferring the time t0 by the first time length.

In one embodiment, the Active Time is later than a first time length after the time t0.

In one embodiment, a start of the Active Time is later than the time t0 by the first time length.

In one embodiment, a time interval between the time t1 and the time t0 in FIG. 7 is equal to the first time length, where the Active Time starts at the time t1.

In one embodiment, it is factor(s) other than transmitting a first scheduling request within a period from the time t0 to a time deferring the t0 by the first time length that causes a start of the Active Time.

In one embodiment, between the time t0 and the time t1 there is no any factor other than a first scheduling request that causes a start of the Active Time.

In one embodiment, the first scheduling request is in a pending state after the time t0.

In one embodiment, the first scheduling request is in a pending state after the time t0, and still remains in the pending state after the time t1.

In one embodiment, the first scheduling request is always in a pending state at any time from the time t0 till later than the time t1.

In one embodiment, between the time t0 and the time t1, any condition in a first condition set is not satisfied.

In one subembodiment, the Active Time is for a specific DRX group.

In one subembodiment, the first condition set comprises: a drx-onDurationTimer for the specific DRX group not being running between the time t0 and the time t1.

In one subembodiment, the first condition set comprises: a drx-onInactivityTimer for the specific DRX group not being running between the time t0 and the time t1.

In one subembodiment, the first condition set comprises: a drx-RetransmissionTimerDL for any serving cell of the specific DRX group not being running between the time t0 and the time t1.

In one subembodiment, the first condition set comprises: a drx-RetransmissionTimerUL for any serving cell of the specific DRX group not being running between the time t0 and the time t1.

In one subembodiment, the first condition set comprises: a ra-ContentionResolutionTimer not being running between the time t0 and the time t1.

In one subembodiment, the first condition set comprises: a msgB-ResponseWindow not being running between the time t0 and the time t1.

In one subembodiment, the first condition set comprises: it is an n-th time that the first scheduling request is transmitted at the time t0, where n is greater than 1.

In one subembodiment, the first condition set comprises: a second scheduling request is transmitted within a first time length before the time t0.

In one subembodiment, the first condition set comprises: a second scheduling request is transmitted within a first time length before the time t0; the second scheduling request corresponds to a same SR configuration as the first scheduling request.

In one subembodiment, the first condition set comprises: upon reception of a random access response (RAR) for a random access preamble other than a contention-based random access preamble selected by the first node, a PDCCH indicator for indicating a new transmission for a C-RNTI is received; the C-RNTI is a C-RNTI of the first node.

In one embodiment, the first scheduling request is canceled at a certain time after a time t1, thus the Active Time does not comprise time after the certain time after the time t1.

Embodiment 8

Embodiment 8 illustrates a schematic diagram of a first message determining whether an Active Time comprises a period of time during which a first scheduling request is in a pending state after being transmitted on a PUCCH or a period of time deferred by a first time length after the first scheduling request's being transmitted and during which the first scheduling request is in a pending state according to one embodiment of the present application, as shown in FIG. 8.

In one embodiment, the first message explicitly indicates whether an Active Time comprises a period of time during which a first scheduling request is in a pending state after being transmitted on a PUCCH or a period of time deferred by a first time length after the first scheduling request's being transmitted and during which the first scheduling request is in a pending state.

In one embodiment, when the first message indicates the usage of a first time length, the Active Time comprises a period of time deferred by a first time length after the first scheduling request's being transmitted and during which the first scheduling request is in a pending state; when the first message does not indicate the usage of the first time length, the Active Time comprises a period of time during which the first scheduling request is in a pending state after being transmitted on a PUCCH.

In one embodiment, when the first message indicates a first time length, the Active Time comprises a period of time deferred by a first time length after the first scheduling request's being transmitted and during which the first scheduling request is in a pending state; when the first message does not indicate the first time length, the Active Time comprises a period of time during which the first scheduling request is in a pending state after being transmitted on a PUCCH.

In one embodiment, when the first message indicates that a first time length is greater than a specific value, the Active Time comprises a period of time deferred by a first time length after the first scheduling request's being transmitted and during which the first scheduling request is in a pending state; when the first time length indicated by the first message is no greater than the specific value, the Active Time comprises a period of time during which the first scheduling request is in a pending state after being transmitted on a PUCCH.

In one embodiment, when the first message indicates a first time length, the Active Time comprises a period of time deferred by a first time length after the first scheduling request's being transmitted and during which the first scheduling request is in a pending state; when the first message does not indicate the first time length, the Active Time comprises a period of time during which the first scheduling request is in a pending state after being transmitted on a PUCCH.

In one embodiment, when the first message indicates the first parameter, the Active Time comprises a period of time deferred by a first time length after the first scheduling request's being transmitted and during which the first scheduling request is in a pending state; when the first message does not indicate the first parameter, the Active Time comprises a period of time during which the first scheduling request is in a pending state after being transmitted on a PUCCH.

In one subembodiment, the first parameter is kmac or K_mac or $K_{mac}$.

In one subembodiment, the first time length can be obtained through the first parameter, the first time length being greater than 0.

In one embodiment, when the first message indicates that the first parameter is greater than a first parameter threshold, the Active Time comprises a period of time deferred by a first time length after the first scheduling request's being transmitted and during which the first scheduling request is in a pending state; when the first message does not indicate that the first parameter is greater than a first parameter threshold, the Active Time comprises a period of time during which the first scheduling request is in a pending state after being transmitted on a PUCCH.

In one subembodiment, the first parameter is kmac or K_mac or $K_{mac}$.

In one subembodiment, the first time length can be obtained through the first parameter, the first time length being greater than 0.

In one subembodiment, the sentence that the first message does not indicate that the first parameter is greater than a first parameter threshold comprises that the first message does not indicate the first parameter.

In one subembodiment, the sentence that the first message does not indicate that the first parameter is greater than a first parameter threshold comprises that the first message indicates the first parameter, but that the first parameter is no greater than the first parameter threshold.

In one subembodiment, the first parameter threshold is a real number.

In one subembodiment, the first parameter threshold is measured in millisecond(s) (ms) or slot(s) or subframe(s) or frame(s).

In one subembodiment, when the first parameter exceeds the first parameter threshold, the first node can be assumed to be in communication with NTN.

In one embodiment, when the first message indicates that a first time length can be calculated, the Active Time comprises a period of time deferred by a first time length after the first scheduling request's being transmitted and during which the first scheduling request is in a pending state; when the first time length cannot be determined, the Active Time comprises a period of time during which the first scheduling request is in a pending state after being transmitted on a PUCCH; the first time length is greater than 0.

In one embodiment, when the first message indicates non-TN, the Active Time comprises a period of time deferred by a first time length after the first scheduling request's being transmitted and during which the first scheduling request is in a pending state; when the first message does not indicate TN, the Active Time comprises a period of time during which the first scheduling request is in a pending state after being transmitted on a PUCCH.

In one embodiment, when the first message indicates NTN, the Active Time comprises a period of time deferred by a first time length after the first scheduling request's being transmitted and during which the first scheduling request is in a pending state; when the first message does not indicate NTN, the Active Time comprises a period of time during which the first scheduling request is in a pending state after being transmitted on a PUCCH.

In one embodiment, when the first message indicates that the present network is NTN, the Active Time comprises a period of time deferred by a first time length after the first scheduling request's being transmitted and during which the first scheduling request is in a pending state; when the first message does not indicate that the present network is NTN or that the present network is TN, the Active Time comprises a period of time during which the first scheduling request is in a pending state after being transmitted on a PUCCH.

In one embodiment, when the first message indicates at least one of ephemeris, height, orbit parameter or perigee parameter, the Active Time comprises a period of time deferred by a first time length after the first scheduling request's being transmitted and during which the first scheduling request is in a pending state; when the first message does not indicate any one of ephemeris, height, orbit parameter or perigee parameter, the Active Time comprises a period of time during which the first scheduling request is in a pending state after being transmitted on a PUCCH.

In one embodiment, when the first message indicates a parameter related to satellite communications, the Active Time comprises a period of time deferred by a first time length after the first scheduling request's being transmitted and during which the first scheduling request is in a pending state; when the first message does not indicate any parameter related to satellite communications, the Active Time comprises a period of time during which the first scheduling request is in a pending state after being transmitted on a PUCCH.

In one embodiment, when the first message indicates a specific PLMN, the Active Time comprises a period of time deferred by a first time length after the first scheduling request's being transmitted and during which the first scheduling request is in a pending state; when the first message does not indicate a specific PLMN, the Active Time comprises a period of time during which the first scheduling request is in a pending state after being transmitted on a PUCCH.

In one subembodiment, the specific PLMN is related to NTN.

In one embodiment, when the first message indicates a third parameter, the Active Time comprises a period of time deferred by a first time length after the first scheduling request's being transmitted and during which the first scheduling request is in a pending state; when the first message does not indicate a third parameter, the Active Time comprises a period of time during which the first scheduling request is in a pending state after being transmitted on a PUCCH.

In one subembodiment, the third parameter is Koffset.

In one subembodiment, the third parameter is used to determine a timing advance, where the timing advance determined based on the third parameter is greater than 2 ms.

In one subembodiment, the third parameter is used to determine a timing advance, where the timing advance determined based on the third parameter is greater than a maximum delay brought about by terrestrial communications.

In one embodiment, when the first message indicates a first parameter, the Active Time comprises a period of time deferred by a first time length after the first scheduling request's being transmitted and during which the first scheduling request is in a pending state; when the first message does not indicate a first parameter, the Active Time comprises a period of time during which the first scheduling request is in a pending state after being transmitted on a PUCCH.

In one subembodiment, the first parameter is Kmac or K_mac.

In one subembodiment, the first parameter indicates a first time difference between a DCI and a PUSCH assigning time-frequency resources via the DCI; the first time difference is greater than a first value, the first value comprising k1 time unit(s), where the time unit is one of {millisecond, second, OFDM symbol, slot, subframe, frame, 2 ms, Chip length}; k1 is a positive integer, and particularly, k1 time unit(s) is a period of time larger than 4 OFDM symbols.

Embodiment 9

Embodiment 9 illustrates a schematic diagram of a sum of a TA maintained by a first node and a first parameter used for determining a first time length according to one embodiment of the present application, as shown in FIG. 9.

In one embodiment, the first time length is equal to a sum of a Timing Advance (TA) maintained by the first node and the first parameter.

In one embodiment, the first time length is equal to a sum of a Timing Advance (TA) maintained by the first node and the first parameter plus a first time offset.

In one embodiment, the first parameter is Kmac or K_mac.

In one subembodiment, the first time offset is indicated by a serving cell of the first node.

In one subembodiment, the first time offset is fixed.

In one embodiment, the first time length is equal to X1 times as much as a sum of a Timing Advance (TA) maintained by the first node and the first parameter plus a first time offset.

In one subembodiment, x1 is a real number.

In one subembodiment, x1 is equal to 0.5.

In one subembodiment, x1 is equal to 2.

In one subembodiment, the first time offset is indicated by a serving cell of the first node.

In one subembodiment, the first time offset is fixed.

In one embodiment, the first time length is equal to a sum of a Timing Advance (TA) maintained by the first node and x2 times as much as the first parameter plus a first time offset.

In one subembodiment, x2 is a real number.

In one subembodiment, x2 is equal to 2.

In one subembodiment, x2 is equal to 0.5.

In one subembodiment, the first time offset is indicated by a serving cell of the first node.

In one subembodiment, the first time offset is fixed.

In one embodiment, the first parameter is used to determine a processing delay of a MAC layer.

In one embodiment, the first parameter is used to determine a round trip time of a MAC layer.

In one embodiment, the first parameter is used to determine a round trip time of a radio signal.

Embodiment 10

Embodiment 10 illustrates a schematic diagram of a second parameter and a third parameter used together for determining an uplink transmission time of a first node according to one embodiment of the present application, as shown in FIG. 10.

In one embodiment, the timing advance $T_{TA}$ maintained by the first node is equal to:

$$T_{TA} = (N_{TA} + N_{TA,UE\text{-}specific} + N_{TA,common} + N_{TA,offset}) \times T_c$$

where $N_{TA}$, $N_{TA,UE\text{-}specific}$, $N_{TA,common}$, $N_{TA,offset}$: are fixed or default or indicated by the system or is determined by the first node itself; Tc is a basic time unit of an NR system, and the specific definition of the Tc can be found in 3GPP TS 38.211, Section 4.1.

In one embodiment, a timing advance offset $N_{TA,offset}$ is indicated by the system.

In one embodiment, $N_{TA}$ is a non-negative integer that can be indicated by a timing advance MAC CE. $N_{TA}$ can be calculated based on a subcarrier spacing.

In one embodiment, when calculating a timing advance of a physical random channel (PRACH) indicated by a PDCCH and a defer time from an RAR window to a msgB-ResponseWindow, $N_{TA}$ is equal to 0.

In one embodiment, $N_{TA,UE\text{-}specific}$ is a timing advance offset for a specific UE.

In one embodiment, $N_{TA,common}$ is a timing advance offset for a whole cell or a beam zone.

In one embodiment, the second parameter is used for determining a timing advance maintained by the first node.

In one embodiment, if the present time is n, a next valid PRACH occasion is in the time after a sum of n and the third parameter.

In one subembodiment, the phrase that time is n means that the present time is one of an n-th slot, an n-th symbol or an n-th subframe.

In one subembodiment, n is an integer, or a non-negative integer, or a positive integer.

In one embodiment, an uplink transmission time of the first node is determined according to a timing advance determined by the second parameter after the present time being deferred by a third parameter.

In one subembodiment, the uplink transmission comprises a transmission of the first PUSCH.

In one embodiment, a time of an uplink transmission of the first PUSCH is equal to a time determined by a timing advance determined by the second parameter.

Embodiment 11

Embodiment 11 illustrates a schematic diagram of at least one of a second parameter or a third parameter used for determining a first PUSCH transmission timing according to one embodiment of the present application, as shown in FIG. 11.

In one embodiment, the second parameter is used to determine a transmission timing of the first PUSCH.

In one subembodiment, the third parameter is unrelated to a transmission timing of the first PUSCH.

In one subembodiment, the second parameter is a TAC.

In one subembodiment, the second parameter is used for determining an uplink timing advance maintained by the first node.

In one subembodiment, a transmission time of the first PUSCH is equal to a time of an uplink timing advance maintained by the first node before a corresponding n-th downlink slot; the first PUSCH is associated with the n-th downlink slot.

In one subembodiment, a transmission time of the first PUSCH is equal to a time of an uplink timing advance maintained by the first node before a corresponding n-th downlink subframe; the first PUSCH is associated with the n-th downlink subframe.

In one subembodiment, a transmission time of the first PUSCH is equal to a time of an uplink timing advance maintained by the first node before a corresponding n-th downlink frame; the first PUSCH is associated with the n-th downlink frame.

In one subembodiment, a transmission time of the first PUSCH is equal to twice as much as a time of an uplink timing advance maintained by the first node before a corresponding n-th downlink slot; the first PUSCH is associated with the n-th downlink slot.

In one subembodiment, a transmission time of the first PUSCH is equal to twice as much as a time of an uplink timing advance maintained by the first node before a corresponding n-th downlink subframe; the first PUSCH is associated with the n-th downlink subframe.

In one subembodiment, a transmission time of the first PUSCH is equal to twice as much as a time of an uplink timing advance maintained by the first node before a corresponding n-th downlink frame; the first PUSCH is associated with the n-th downlink frame.

In one embodiment, any one of the corresponding n-th downlink subframe or slot or frame is fixed, or is indicated by a serving cell of the first node, or is determined according to the third parameter.

In one embodiment, the third parameter is used to determine a transmission timing of the first PUSCH.

In one subembodiment, a sum of the third parameter and a first candidate n is n, where the first candidate n is fixed, or is indicated by a serving cell of the first node; the first PUSCH is associated with the n;

In one subembodiment, the first PUSCH is associated with the n-th downlink subframe.

In one subembodiment, the first PUSCH is associated with the n-th downlink slot.

In one subembodiment, the first PUSCH is associated with the n-th downlink frame.

In one subembodiment, assuming that the third parameter is not indicated, the first PUSCH is associated with one of the first candidate n{subframe, slot, frame}.

In one subembodiment, the third parameter is k_offset or Koffset.

In one embodiment, the second parameter and the third parameter are used together to determine a transmission time of the first PUSCH.

In one embodiment, the first PUSCH being associated with an n-th downlink slot means that assuming that no timing advance is used, or a timing advance is equal to 0, the time occupied by the first PUSCH belongs to the n-th downlink slot, or is comprised by the n-th downlink slot, or is overlapping with the n-th downlink slot.

In one embodiment, the first PUSCH being associated with an n-th downlink subframe means that assuming that no timing advance is used, or a timing advance is equal to 0, the time occupied by the first PUSCH belongs to the n-th downlink subframe, or is comprised by the n-th downlink subframe, or is overlapping with the n-th downlink subframe.

In one embodiment, the first PUSCH being associated with an n-th downlink frame means that assuming that no timing advance is used, or a timing advance is equal to 0, the time occupied by the first PUSCH belongs to the n-th downlink frame, or is comprised by the n-th downlink frame, or is overlapping with the n-th downlink frame.

Embodiment 12

Figure 12:
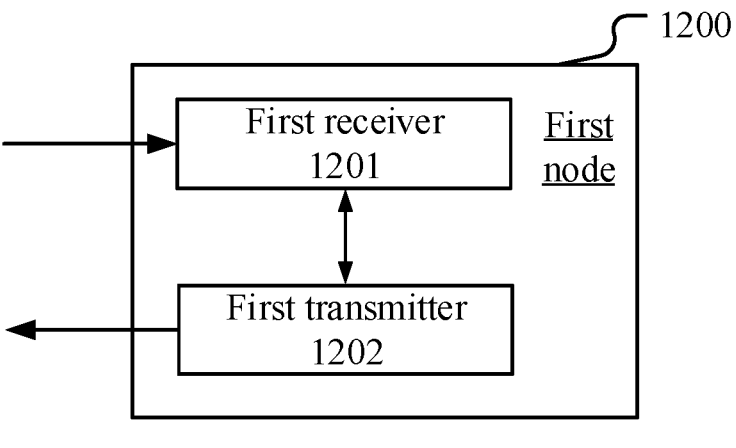
FIG. 12 illustrates a structure block diagram of a processing device in a first node according to one embodiment of the present application.

Embodiment 12 illustrates a structure block diagram of a processing device used in a first node according to one embodiment of the present application; as shown in FIG. 12. In FIG. 12, a processing device 1200 in a first node is comprised of a first receiver 1201 and a first transmitter 1202. In Embodiment 12, the first receiver 1201 receives a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and the first transmitter 1202 transmits the first scheduling request on a first PUCCH resource;

the first receiver 1201 monitors a PDCCH in the Active Time.

In one embodiment, the first transmitter 1202 increments a first counter by 1 along with a transmission of the first scheduling request;

herein, only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted.

In one embodiment, the first transmitter 1202 increments a first counter by 1 along with a transmission of the first scheduling request;

herein, the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter.

In one embodiment, the first receiver 1201 receives a first system information block (SIB); the first system information block (SIB) indicating a first parameter, where the first parameter is measured in slot(s);

herein, a sum of a Timing Advance (TA) maintained by the first node 1200 and the first parameter is used for determining the first time length; the first message indicates that the Active Time comprises a period of time during which the first scheduling request is in a pending state deferred by the first time length after being transmitted.

In one embodiment, the first receiver 1201 receives a first system information block (SIB) and a first Media Access Control Control Element (MAC CE), the first MAC CE indicating a second parameter; the second parameter is measured in slot(s); the first SIB indicates a third parameter, the third parameter being measured in slot(s);

the first transmitter 1202 increments a first counter by 1 along with a transmission of the first scheduling request; and as a response to that the first counter is equal to a first threshold, initiating a first random access procedure;

the action of initiating a first random access procedure comprises transmitting a second message on time-frequency resources indicated by a random access response (RAR) for the first random access procedure; the second message occupying a first physical uplink shared channel (PUSCH);

herein, the second parameter and the third parameter are used together for determining an uplink transmission time of the first node 1200; at least one of the second parameter or the third parameter is used for determining a transmission timing of the first PUSCH.

In one embodiment, the first transmitter 1202 starts a first timer along with a transmission of the first scheduling request;

herein, the first scheduling request is transmitted only when the first timer is not running, and an expiration value of the first timer is equal to the first time length; the first message indicates that the Active Time comprises a period of time during which the first scheduling request is in a pending state deferred by the first time length after being transmitted.

In one embodiment, the first transmitter 1202 generates a second MAC CE; and as a response to at least generating the second MAC CE, triggers the first scheduling request; transmits a first MAC PDU group; and along with the transmission of the first MAC PDU group, cancels the first scheduling request; the first MAC PDU group comprising at least one MAC PDU;

herein, the action of monitoring a PDCCH in the Active Time comprises receiving a first signaling; the first MAC PDU group occupies time-frequency resources indicated by the first signaling.

In one embodiment, the first transmitter 1202 increments a first counter by 1 along with a transmission of any scheduling request corresponding to the first scheduling request configuration;

herein, only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted.

In one embodiment, the first receiver 1201 receives a first scheduling request configuration, where a scheduling request configuration corresponding to the first scheduling request is the first scheduling request configuration;

the first transmitter 1202 increments a first counter by 1 along with a transmission of any scheduling request corresponding to the first scheduling request configuration;

herein, the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter.

In one embodiment, the first scheduling request configuration is an SR configuration.

In one embodiment, the first node is a UE.

In one embodiment, the first node is a terminal supporting large delay difference.

In one embodiment, the first node is a terminal supporting NTN.

In one embodiment, the first node is an aircraft.

In one embodiment, the first node is a vehicle-mounted terminal.

In one embodiment, the first node is a relay.

In one embodiment, the first node is a vessel.

In one embodiment, the first node is an IoT terminal.

In one embodiment, the first node is an IIoT terminal.

In one embodiment, the first node is a piece of equipment supporting transmissions with low delay and high reliability.

In one embodiment, the first node is a sidelink communication node.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

Embodiment 13

Figure 13:
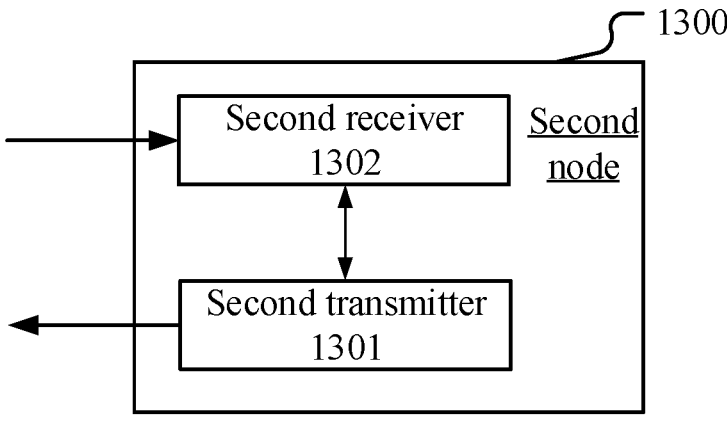
FIG. 13 illustrates a structure block diagram of a processing device in a second node according to one embodiment of the present application.

Embodiment 13 illustrates a structure block diagram of a processing device used in a second node according to one embodiment of the present application; as shown in FIG. 13. In FIG. 13, a processing device 1300 in a second node is comprised of a second transmitter 1301 and a second receiver 1302. In Embodiment 13, the second transmitter 1301 transmits a first message; the first message indicating whether an Active Time comprises a period of time during which a first scheduling request is in a pending state after being transmitted on a PUCCH or a period of time deferred by a first time length after the first scheduling request's being transmitted and during which the first scheduling request is in a pending state; and the second receiver 1302 receives the first scheduling request on a first PUCCH resource;

herein, a transmitter of the first scheduling request monitors a PDCCH in the Active Time.

In one embodiment, along with a transmission of the first scheduling request, a first counter is incremented by 1;

herein, only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted.

In one embodiment, along with a transmission of the first scheduling request, a first counter is incremented by 1;

herein, the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter.

In one embodiment, the second transmitter 1301 transmits a first system information block (SIB); the first system information block (SIB) indicating a first parameter, where the first parameter is measured in slot(s);

herein, a sum of a Timing Advance (TA) maintained by a transmitter of the first scheduling request and the first parameter is used for determining the first time length; the first message indicates that the Active Time comprises a period of time during which the first scheduling request is in a pending state deferred by the first time length after being transmitted.

In one embodiment, the second transmitter 1301 transmits a first system information block (SIB) and a first Media Access Control Control Element (MAC CE), the first MAC CE indicating a second parameter; the second parameter is measured in slot(s); the first SIB indicates a third parameter, the third parameter being measured in slot(s);

along with a transmission of the first scheduling request, a first counter is incremented by 1; the first counter being equal to or greater than a first threshold triggers a first random access procedure;

the second transmitter 1301 transmits a random access response (RAR) for the first random access procedure;

the second receiver 1302 receives a second message on the time-frequency resources indicated by the random access response (RAR) for the first random access procedure; the second message occupying a first physical uplink shared channel (PUSCH);

herein, the second parameter and the third parameter are used together for determining a Timing Advance (TA) maintained by a transmitter of the first scheduling request; at least one of the second parameter or the third parameter is used for determining a transmission timing of the first PUSCH.

In one embodiment, along with a transmission of the first scheduling request, a first timer is started;

herein, the first scheduling request is transmitted only when the first timer is not running, and an expiration value of the first timer is equal to the first time length; the first message indicates that the Active Time comprises a period of time during which the first scheduling request is in a pending state deferred by the first time length after being transmitted.

In one embodiment, the second transmitter 1301 transmits a first signaling on the PDCCH; the second receiver 1302 receives a first MAC PDU group; the second MAC CE triggering the first scheduling request; and along with the transmission of the first MAC PDU group, the first scheduling request is canceled; the first MAC PDU group comprising at least one MAC PDU;

herein, the first MAC PDU group occupies time-frequency resources indicated by the first signaling.

In one embodiment, the second transmitter 1301 transmits a first scheduling request configuration, where a scheduling request configuration corresponding to the first scheduling request is the first scheduling request configuration;

along with a transmission of any scheduling request corresponding to the first scheduling request configuration, a first counter is incremented by 1;

herein, only when the first counter is equal to 1 does the first message indicate whether the Active Time comprises a period of time during which the first scheduling request is in a pending state after being transmitted on a PUCCH or a period of time during which the first scheduling request is in a pending state deferred by the first time length after being transmitted.

In one embodiment, the second transmitter 1301 transmits a first scheduling request configuration, where a scheduling request configuration corresponding to the first scheduling request is the first scheduling request configuration;

along with a transmission of any scheduling request corresponding to the first scheduling request configuration, a first counter is incremented by 1;

herein, the first message indicating whether the Active Time comprises a period of time during which the first scheduling request is in a pending state after being transmitted on a PUCCH or a period of time during which the first scheduling request is in a pending state deferred by the first time length after being transmitted is unrelated to the first counter.

In one embodiment, the second node is a satellite.

In one embodiment, the second node is an IoT node.

In one embodiment, the second node is a relay.

In one embodiment, the second node is an access point.

In one embodiment, the second node is a base station.

In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second receiver 1302 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IoT), RFID terminals, NB-IoT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:

a transceiver; and a processor, wherein the transceiver and the processor are configured to:

receive, from a base station, a system information block (SIB), determine an active time based on the SIB, such that:

on a condition that the SIB does not indicate non-terrestrial network (NTN) communication, the Active Time comprises a first period of time after transmission of a scheduling request, during which the scheduling request is pending, and on a condition that the SIB indicates NTN communication, the Active Time comprises a second period of time deferred by a time length after the transmission of the scheduling request during which the scheduling request is pending, transmit the scheduling request on a physical uplink control channel (PUCCH) resource, and monitor a physical downlink control channel (PDCCH) in the Active Time, wherein the UE supports the NTN communication.

2. The UE according to claim 1, wherein the transceiver and the processor are further configured to:

increment a counter by 1 along with a transmission of the scheduling request, wherein only when the first counter is equal to 1 does the SIB indicate whether the Active Time comprises the first period or the second period of time.

3. The UE according to claim 1, wherein the transceiver and the processor are further configured to:

increment a counter by 1 along with a transmission of the scheduling request, wherein the is unrelated to the counter.

4. The UE according to claim 1, wherein the SIB is indicative of a first parameter, and wherein the first parameter is measured in one or more slot, and wherein a sum of a Timing Advance (TA) maintained by the UE and the first parameter is used for determining the time length, and wherein the SIB indicates that the Active Time comprises the second period of time.

5. The UE according to claim 4, wherein the first parameter is $k_{mac}$.

6. The UE according to claim 4, wherein the transceiver and the processor are further configured to:

receive a Media Access Control Control Element (MAC CE), wherein the MAC CE is indicative of a second parameter measured in one or more slot, and wherein the SIB indicates a third parameter measured in one or more slot, increment a counter by 1 along with a transmission of the scheduling request, as a response to that the counter is equal to a threshold, initiating a random access procedure, wherein initiating the random access procedure comprises transmitting a message on one or more time-frequency resources indicated by a random access response (RAR) for the random access procedure, wherein the message occupies a physical uplink shared channel (PUSCH), wherein the second parameter and the third parameter are used together for determining an uplink transmission time of the UE, and wherein at least one of the second parameter or the third parameter is used for determining a transmission timing of the first PUSCH.

7. The UE according to claim 1, the transceiver and the processor are further configured to:

start a timer along with a transmission of the scheduling request, wherein the scheduling request is transmitted only when the timer is not running, and an expiration value of the timer is equal to the time length, and wherein the SIB indicates that the Active Time comprises the second period of time.

8. A method in a user equipment (UE) for wireless communications, the method comprising:

receiving, from a base station, a system information block (SIB);

determine an active time based on the SIB, such that:

on a condition that the SIB does not indicate non-terrestrial network (NTN) communication, the Active Time comprises a first period of time after transmission of a scheduling request, during which the scheduling request is pending, and on a condition that the SIB indicates NTN communication, the Active Time comprises a second period of time deferred by a time length after the transmission of the scheduling request, during which the scheduling request is pending;

transmitting the scheduling request on a physical uplink control channel (PUCCH) resource; and monitoring a physical downlink control channel (PDCCH) in the Active Time, wherein the UE supports the NTN communication.

\* \* \* \* \*